United States Patent
Konno

(10) Patent No.: US 10,746,266 B2
(45) Date of Patent: Aug. 18, 2020

(54) CHAIN GUIDE AND CHAIN TRANSMISSION

(71) Applicant: TSUBAKIMOTO CHAIN CO., Osaka-shi, Osaka (JP)

(72) Inventor: Masahiko Konno, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 297 days.

(21) Appl. No.: 15/889,579

(22) Filed: Feb. 6, 2018

(65) Prior Publication Data
US 2018/0238425 A1 Aug. 23, 2018

(30) Foreign Application Priority Data
Feb. 22, 2017 (JP) .................................. 2017-31026

(51) Int. Cl.
*F16H 7/18* (2006.01)
*F16H 7/08* (2006.01)
(Continued)

(52) U.S. Cl.
CPC ............... *F16H 7/18* (2013.01); *F16H 7/06* (2013.01); *F16H 7/08* (2013.01);
(Continued)

(58) Field of Classification Search
CPC ........ F16H 7/08; F16H 7/18; F16H 2007/185; F16H 2007/0863; F16H 2007/0872;
(Continued)

(56) References Cited

U.S. PATENT DOCUMENTS 4,571,229 A * 2/1986 Burk ....................... F16G 13/06
474/231
5,382,199 A * 1/1995 Ducharme ............ B65G 17/42
474/210
(Continued)

FOREIGN PATENT DOCUMENTS

| JP | H10-019100 A | 1/1998 |
| JP | 2006-242357 A | 9/2006 |
| JP | 2014-145398 A | 8/2014 |

OTHER PUBLICATIONS

JPH1019100A Translation; Mott et al; Chain Guide; Published: Jan. 20, 1998; Espacenet; (Year: 1998).*

*Primary Examiner* — Michael R Mansen
*Assistant Examiner* — Raveen J Dias
(74) *Attorney, Agent, or Firm* — Westerman, Hattori, Daniels & Adrian, LLP

(57) ABSTRACT

Provided is a chain guide and a chain transmission that can reduce sliding resistance between the chain and guide lips, and can maintain a consistent oil film between the guide lips and outer plates. Guide lips each include a first contact convex portion formed on an upstream end in a chain running direction, and a second contact convex portion formed downstream of the first contact convex portion. The first contact convex portion includes a first peak and a first upstream slope formed upstream of the first peak. The second contact convex portion includes a second peak and a second upstream slope formed upstream of the second peak. The dimension in the chain running direction from an upstream end of a guide rail surface to the first peak is set smaller than a chain pitch.

4 Claims, 9 Drawing Sheets

(51) Int. Cl.
  *F16H 7/06* (2006.01)
  *B62M 9/00* (2006.01)
  *F16H 57/05* (2006.01)

(52) U.S. Cl.
  CPC ....... *B62M 2009/007* (2013.01); *F16H 57/05* (2013.01); *F16H 2007/0872* (2013.01); *F16H 2007/185* (2013.01)

(58) Field of Classification Search
  CPC ..... F16H 2007/0874; F16H 2007/0891; F16H 2007/0893; F16H 2007/0895; F16H 2007/0897
  USPC ........................................................ 474/140
  See application file for complete search history.

(56) References Cited

U.S. PATENT DOCUMENTS

| | | | |
|---|---|---|---|
| 5,779,582 A | 7/1998 | Mott et al. | |
| 7,951,029 B2* | 5/2011 | Oota | F16H 7/18 474/111 |
| 7,967,708 B2* | 6/2011 | Hayami | F16H 7/18 474/111 |
| 2003/0040385 A1* | 2/2003 | Konno | F16H 7/18 474/111 |
| 2006/0199689 A1 | 9/2006 | Yoshimoto et al. | |
| 2013/0059688 A1* | 3/2013 | Konno | F16H 7/18 474/140 |
| 2013/0090201 A1* | 4/2013 | Mori | F16H 7/18 474/140 |
| 2014/0179473 A1* | 6/2014 | Konno | F16H 7/18 474/140 |
| 2014/0213401 A1 | 7/2014 | Konno et al. | |
| 2014/0274513 A1* | 9/2014 | Ishikawa | F16H 7/18 474/140 |
| 2015/0051035 A1* | 2/2015 | Wilbur | F16G 13/06 474/231 |
| 2017/0370449 A1* | 12/2017 | Ogo | F16H 7/18 |
| 2018/0038459 A1* | 2/2018 | Konno | F16H 7/06 |
| 2018/0195583 A1* | 7/2018 | Lu | F16H 7/18 |

* cited by examiner

CHAIN GUIDE AND CHAIN TRANSMISSION

BACKGROUND OF THE INVENTION

1. Field of the Invention

The present invention relates to a chain guide that slidably guides a chain, and to a chain transmission.

2. Description of the Related Art

Conventionally, chain transmissions incorporated in a timing system or the like in a car engine room and equipped with a chain, such as a roller chain passed around a plurality of sprockets, and a chain guide that maintains an appropriate chain tension, are known (see, for example, Japanese Patent Application Laid-open No. 2006-242357).

The chain guide has a guide rail surface for slidably guiding link plates of the chain, and guide lips protruding upward on both ends of the guide rail surface in the width direction. The guide lips prevent the chain from coining off the chain guide even when the chain is shifted to one side of the chain width direction as it runs on the guide rail surface.

SUMMARY OF THE INVENTION

Conventional chain transmissions had the following problems: When the chain is offset to either side in the width direction of the chain as it runs on the guide rail surface of the chain guide, the outer side faces of outer plates Make sliding contact with the inner side face of the guide lip over the entire length of the guide. The increased sliding resistance causes a reduction in fuel economy of the car engine.

When the chain guide is largely curved along the longitudinal direction so that the guide rail surface has a small radius of curvature, the problem noted above is exacerbated, since the pressure from the chain on the inner side face of the guide lip is higher when the chain is tense.

Furthermore, when the chain runs with the outer side faces of the outer plates in contact with the inner side face of the guide lip, the oil film between the inner side face of the guide lip and the outer side faces of the outer plates may become thinner, or run out, around the center in the longitudinal direction of the guide. Wear may progress on the inner side faces of the guide lips, as a result of which smooth running of the chain may be impeded, or the chain may drop due to a possible damage on the guide lips.

The present invention solves these problems, its object being to provide a chain guide and a chain transmission that can reduce sliding resistance between the chain and guide lips, and can maintain a consistent oil film between the guide lips and outer plates.

The present invention solves the problems noted above by providing a chain guide that slidably guides a chain, having the following features: The chain guide includes a guide rail surface that slidably guides the chain, and guide lips protruding upward on both side edges of the guide rail surface in a guide width direction. The guide lips each include a first contact convex portion protruding from an inner side face of the guide lip on an upstream end in a chain running direction, and a second contact convex portion protruding from an inner side face of the guide lip on a downstream side of the first contact convex portion. The first contact convex portion includes a first peak positioned innermost in the guide width direction in the first contact convex portion, and a first upstream slope formed upstream of the first peak in the chain running direction and inclined inward in the guide width direction toward a downstream side in the chain running direction. The second contact convex portion includes a second peak positioned innermost in the guide width direction in the second contact convex portion, and a second upstream slope formed upstream of the second peak in the chain running direction and inclined inward in the guide width direction toward a downstream side in the chain running direction. The dimension in the chain running direction from an upstream end of the guide rail surface to the first peak is set smaller than a chain pitch.

The chain transmission of the present invention achieves the object noted above by having the chain guide, and a chain slidably guided by the chain guide.

The term "chain pitch" used herein refers to the distance in the longitudinal direction of the chain between the centers of the pair of front and rear connecting pins coupled to the outer plates.

According to one aspect of the present invention, the guide lips each include a first contact Convex portion protruding from an inner side face of the guide lip on an upstream end in a chain running direction, and a second contact convex portion protruding from an inner side face of the guide lip on a downstream side of the first contact convex portion, and the dimension in the chain running direction from the upstream end of the guide rail surface to the first peak of the first contact convex portion is set smaller than the chain pitch. Consequently, even when the chain is positioned closer to either side in the guide width direction as it enters the chain guide, the chain can be guided to an inner position in the guide width direction by the first contact convex portion immediately after entrance into the guide, and the chain running position can be kept on the inner side of the guide width direction over the entire length of the guide by the first contact convex portion and second contact convex portion. As a result, while chain drop or chain flexing is prevented, contact between the chain and the guide lips can be avoided in the contact avoid zone that is formed between the first peak and the second peak in the chain running direction where the inner side faces of the guide lips are offset outward in the guide width direction, so that the sliding resistance between the guide lips and the chain can be reduced.

Since, there is more area where a gap is formed between the inner side faces of the guide lips and the outer side faces of outer plates, oil film between the inner side faces of the guide lips and the outer plates is prevented from becoming thin, or from running out, so that wear or damage of the guide lips can be prevented.

Also, since there is more area where a gap is formed between the inner side faces of the guide lips and the outer side faces of outer plates, oil can be fed from outside to between the guide lips and the outer plates by using the gaps. The gaps can also help release the heat generated by the sliding contact between the guide lips and outer plates, so that temperature rise of the chain guide can be prevented. This reduces the speed of heat degradation of the chain guide so that its life can be extended. Suppressing temperature rise can also help maintain the hardness of the chain guide, so that an increase in sliding resistance can be prevented.

Moreover, with the first contact convex portion protruding from an inner side face of the guide lip at an upstream end in the chain running direction and the second contact convex portion protruding from an inner side face of the guide lip downstream of the first contact convex portion, lubricating oil held on the guide rail surface of the chain guide is prevented from flowing put.

According to another aspect of the present invention, the first contact convex portion includes a first downstream slope that is formed downstream of the first peak in the chain running direction and is inclined outward in the guide width direction toward the downstream side in the chain running direction, and the first downstream slope and the second upstream slope are formed flat or as a curved surface bulging inward in the guide width direction. As a result, lubricating oil can easily be distributed over the entire guide rail surface of the chain guide, particularly to the downstream side of the guide rail surface of the chain guide, so that the sliding resistance between the chain guide and the chain can be reduced.

According to another aspect of the present invention, the guide lip includes a third contact convex portion protruding from an inner side face of the guide lip in a region between the first contact convex portion and the second contact convex portion in the chain running direction. As a result, even when the chain guide is curved largely along the guide longitudinal direction so that the guide rail surface has a small radius of curvature, sliding resistance between the guide lips and outer plates can be reduced, while the chain running position can be kept on the inner side of the guide width direction over the entire length of the guide.

According to another aspect of the present invention, a third contact convex portion is formed at a downstream end of a guide lip portion that is positioned upstream of a cut-off portion of the chain guide, and another third contact convex portion is formed at an upstream end of a guide lip portion that is positioned downstream of the cut-off portion. As a result, even when a cut-off portion is formed to the chain guide for the purpose of avoiding interference with part of the engine block or the like, the chain running position in the guide width direction is kept on the inner side of the guide width direction, while interference between the chain and part of the engine block or the like is avoided. Also, lubricating oil held on the guide rail surface of the chain guide is prevented from flowing out at the cut-off portion.

According to another aspect of the present invention, lubricating oil can easily be distributed over the entire guide rail surface of the chain guide, particularly to the downstream side of the guide rail surface of the chain guide, so that the sliding resistance between the chain guide and the chain can be reduced.

According to another aspect of the present invention, at least one of the guide lips is formed continuously from the first contact convex portion to the second contact convex portion. As a result, lubricating oil held on the guide rail surface of the chain guide is prevented from flowing out, so that the sliding resistance between the chain guide and the chain can be reduced.

DESCRIPTION OF THE PREFERRED EMBODIMENTS

A chain transmission 10 that is a first embodiment of the present invention will be hereinafter described with reference to the drawings.

Figure 1:
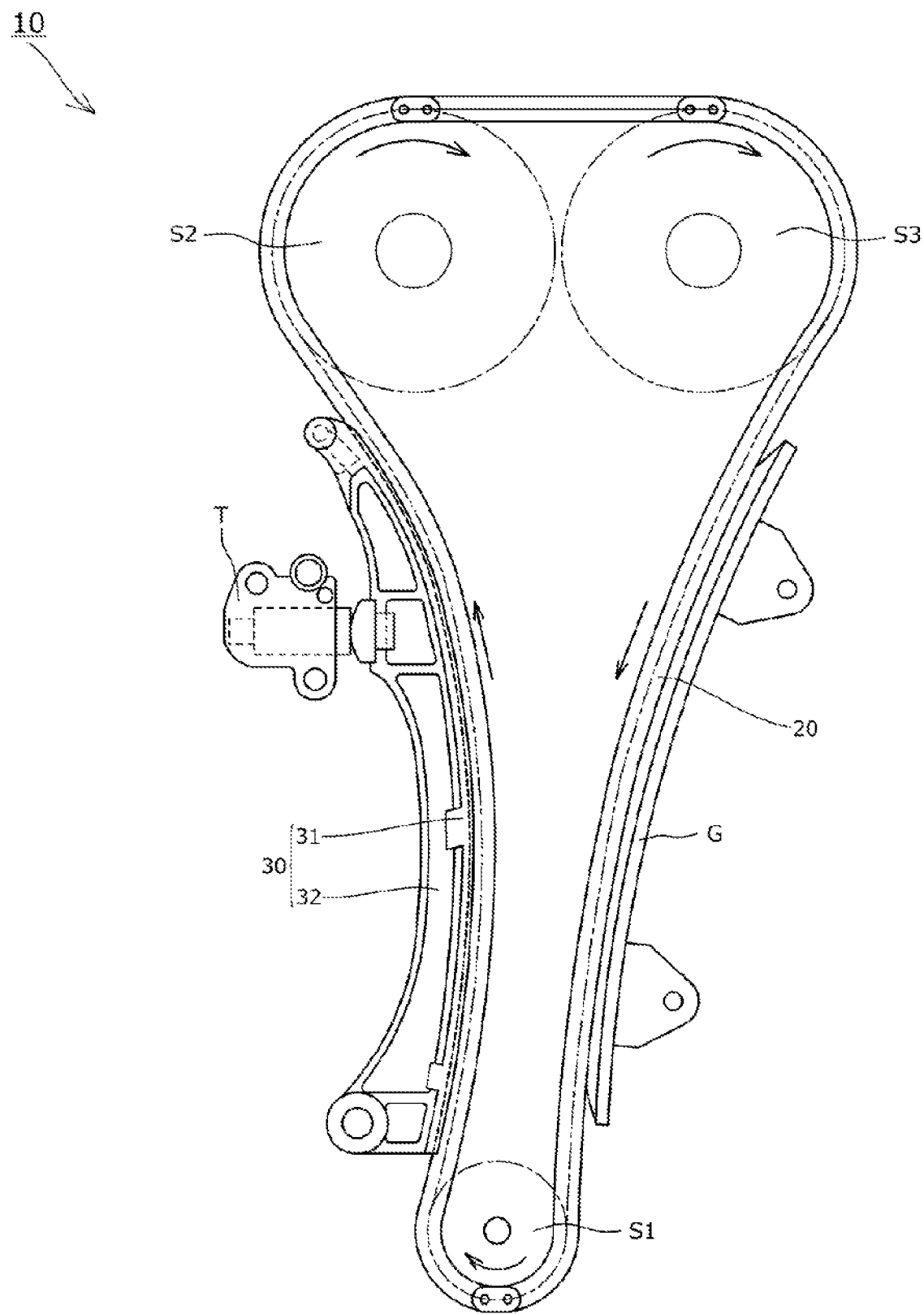
FIG. 1 is art illustrative diagram showing one form of a chain transmission in use according to a first embodiment of the present invention.

The chain transmission 10 is Incorporated in a timing system of a car engine. As shown in FIG. 1, the chain transmission includes sprockets S1 to S3 provided to a crankshaft and cam shafts inside an engine room, a chain 20 passed around the sprockets S1 to S3, a chain guide 30 as a movable guide set on the slack side of the chain 20, a fixed guide G set on the tight side of the chain 20, and a tensioner T that presses the chain guide 30 toward the chain 20.

Figure 2:
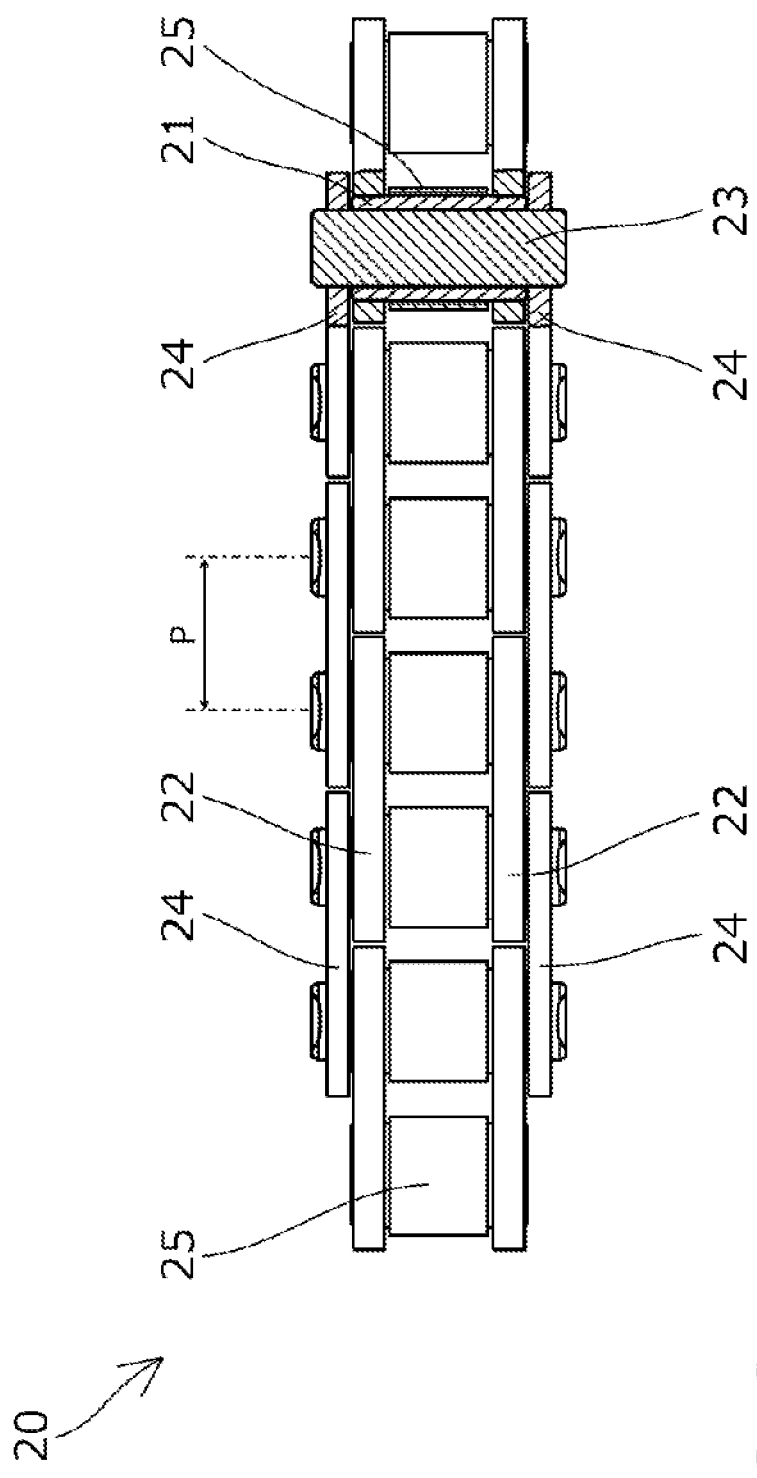
FIG. 2 is an illustrative diagram showing part of the chain in a cross-sectional view.

The chain 20 is formed as a so-called roller chain and includes, as shown in FIG. 2, a plurality of inner links in which both ends of a pair of front and rear bushings 21 are fixedly held in bushing holes of a pair of left and right inner plates (link plates) 22, a plurality of outer links in which both ends of a pair of front and rear connecting pins 23 are fixedly held in pin holes of a pair of left and right outer plates (link plates) 24, and rollers 25 fitted on the bushings 21. These inner links and outer links are alternately connected to each other along the longitudinal direction of the chain by inserting the connecting pins 23 in the bushings 21.

Both ends of the connecting pins 23 protrude from outer side faces of the outer plates 24. When the chain 20 is placed on a guide rail surface 31$a$, both ends of the connecting pins 23 are located at higher positions than guide lips 40. Therefore, when the chain 20 shifts to one side in the guide width direction, the end portions of the connecting pins 23 protruding from the outer side faces of the outer plates 24 do not contact the inner side face of the guide lip 40, and instead, the outer side faces of the outer plates 24 make contact with the inner side face of the guide lip 40.

The chain guide 30 is pivotally attached to an engine block (not shown) to slidably guide the chain 20. As shown in FIG. 1, the chain guide includes a guide shoe 31 that slidably guides the running chain 20, and a base member 32 that supports the guide shoe 31 along the guide longitudinal direction (chain longitudinal direction). The guide shoe 31 and base member 32 are made of a synthetic resin material or the like.

Figure 3:
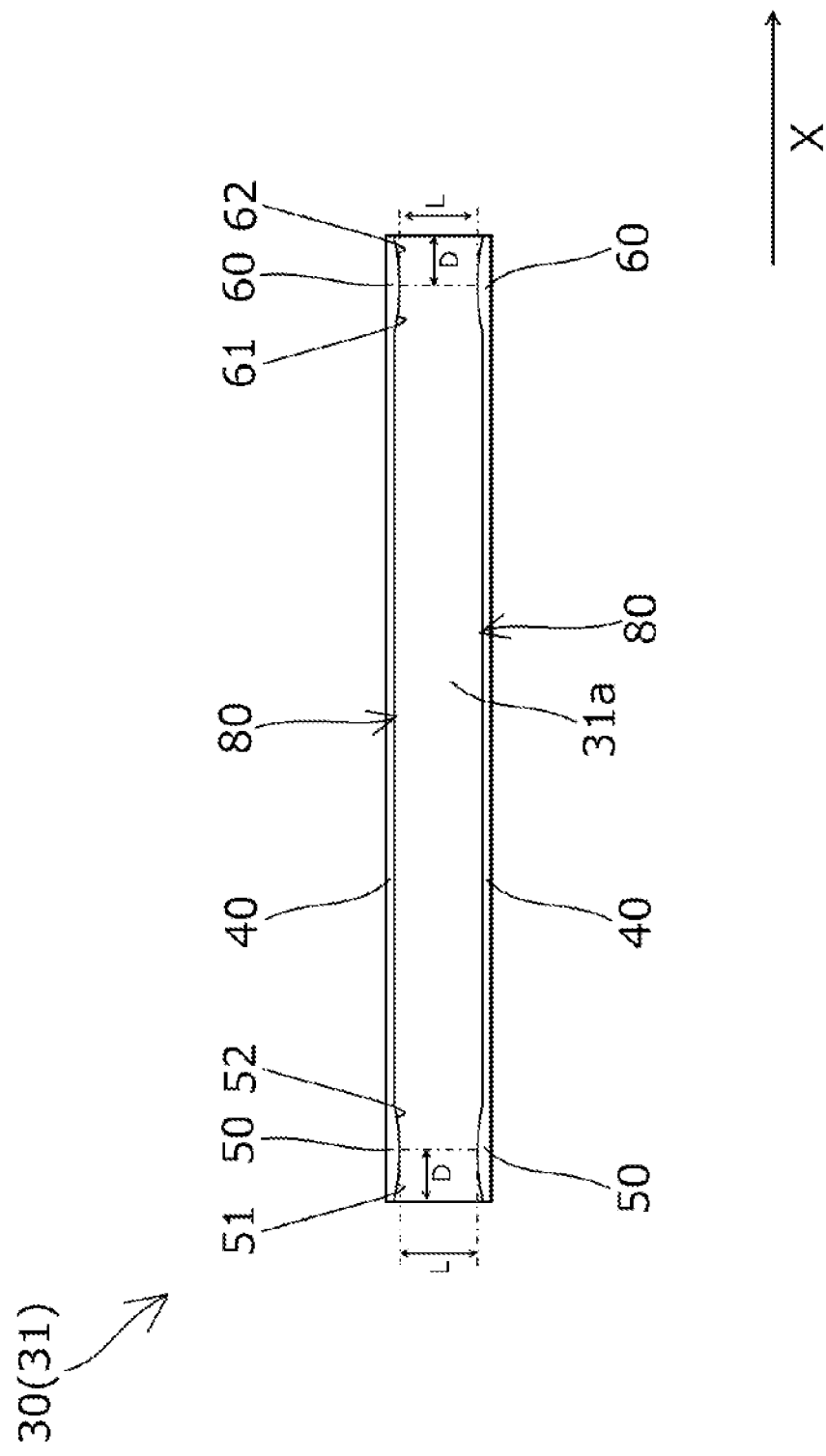
FIG. 3 is a plan view showing a guide shoe of a chain guide.

As shown in FIG. 3, the guide shoe 31 has a guide rail surface 31$a$ that extends in the chain longitudinal direction and slidably guides the chain 20, and guide lips 40 protruding upward on both side edges of the guide rail surface 31$a$ in the guide width direction.

Each guide lip 40 includes a first contact convex portion 50 formed on an upstream end of the chain running direction X, and a second contact convex portion 60 formed downstream of the first contact convex portion 50 (specifically, on a downstream side of the chain running direction X), as shown in FIG. 3.

The first contact convex portions 50 are formed at the same position in the chain running direction X (namely, opposite positions in the guide width direction), and the second contact convex portions are formed at the same position in the chain running direction X (namely, opposite positions in the guide width direction).

The first contact convex portions 50 are each formed to protrude inward in the guide width direction from the inner side faces of the guide lips 40. As shown in FIG. 3, each first contact convex portion 50 includes a first peak that is positioned innermost in the guide width direction in the first contact convex portion 50, a first upstream slope 51 positioned upstream of the first peak in the chain running direction X, and a first downstream slope 52 positioned downstream of the first peak in the chain running direction X.

The second contact convex portions 60 are each formed to protrude inward in the guide width direction from the inner side faces of the guide lips 40. As shown in FIG. 3, each second contact convex portion 60 includes a second peak that is positioned innermost in the guide width direction in the second contact convex portion 60, a second upstream slope 61 positioned upstream of the second peak in the chain running direction X, and a second downstream slope 62 positioned downstream of the second peak in the chain running direction X.

The first upstream slope 51 and second upstream slope 61 are formed as curved surfaces bulging inward in the guide width direction as shown in FIG. 3, and inclined inward in the guide width direction toward downstream of the chain running direction X.

The first downstream slope 52 and second downstream slope 62 are formed as curved surfaces bulging inward in the guide width direction as shown in FIG. 3, and inclined outward in the guide width direction toward downstream of the chain running direction X.

The rear end of the first downstream slope 52 and the front end of the second upstream slope 61 are connected, in the chain running direction X, with the inner side face of the guide lip 40, which is formed flat along the chain running direction X (straight when viewed in plan) as shown in FIG. 3. In other words, the guide lips 40 are formed continuously from the first contact convex portion 50 to the second contact convex portion 60.

As shown in FIG. 3, the dimension D in the chain running direction X from the upstream end of the guide rail surface 31a to the first peak of the first contact convex portion 50, and from the downstream end of the guide lip 40 to the second peak of the second contact convex portion 60, is set smaller than a chain pitch P.

The chain pitch P refers to the distance in the longitudinal direction of the chain between the centers of the pair of front and rear connecting pins 23 coupled to the outer plates 24 as shown in FIG. 2.

As shown in FIG. 3, the distance L in the guide width direction between the first peaks of the pair of first contact convex portions 50, and between the second peaks of the pair of second contact convex portions 60, is set smaller than the distance in the guide width direction between the pair of guide lips 40 in other parts.

Between the first peaks of the first contact convex portions 50 and the second peaks of the second contact convex portions 60 in the chain running direction X are formed contact avoid zones 80, where the inner side faces of the guide lips 40 are offset outward in the guide width direction so that contact between the chain 20 and the guide lips 40 is avoided in these contact avoid zones 80.

Next, a chain transmission 10 according to a second embodiment of the present invention will be described with reference to FIG. 4. The second embodiment is the same as the previously described first embodiment except some parts of the guide lips 40, and therefore the configurations other than the differences will not be described.

Figure 4:
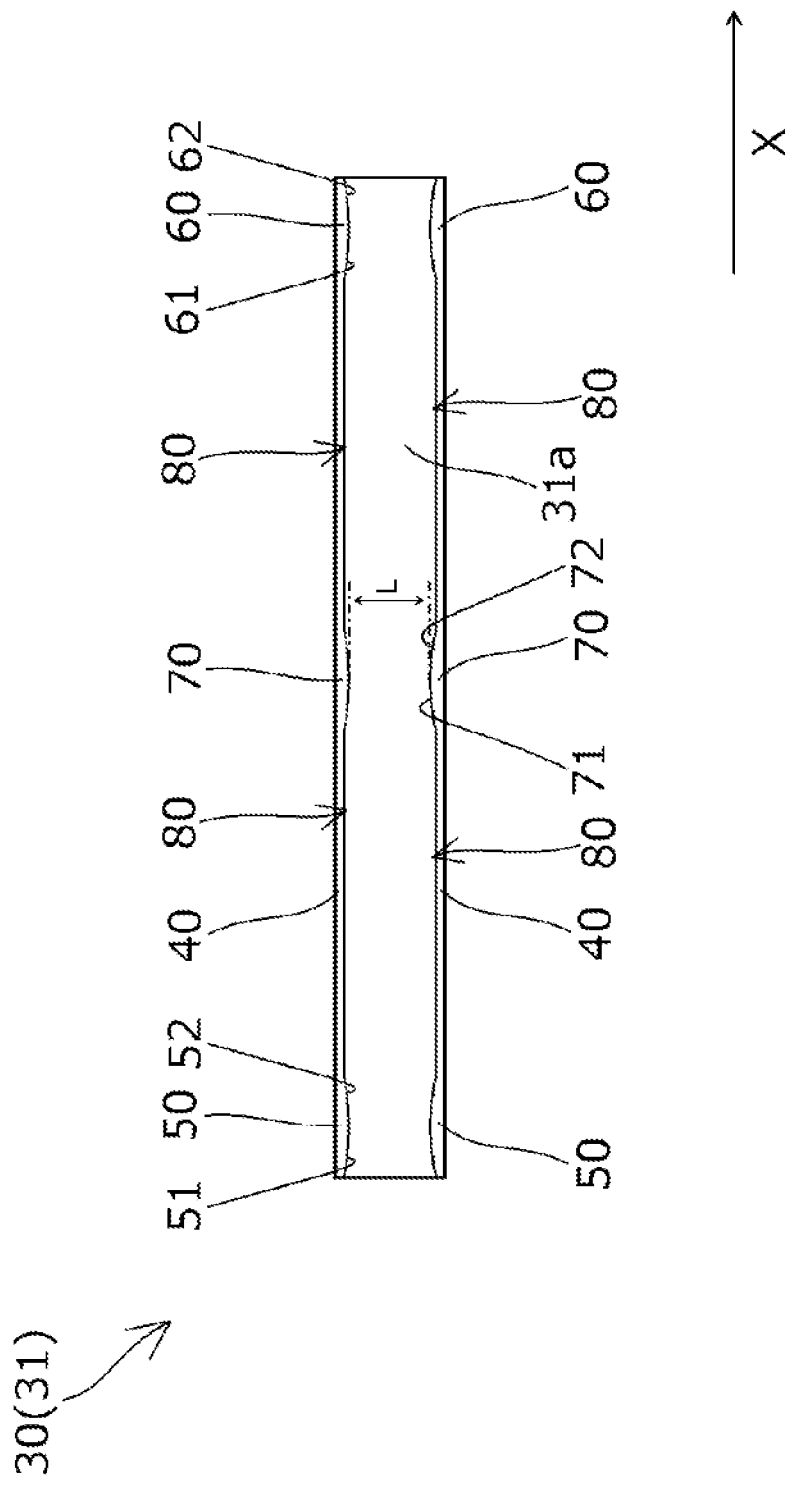
FIG. 4 is a plan view showing the guide shoe of a chain guide according to a second embodiment.

In the second embodiment, as shown in FIG. 4, the guide lips 40 each include third contact convex portions 70 between the first contact convex portions 50 and second contact convex portions 60 in the chain running direction X (at a center position in this embodiment).

The third contact convex portions 70 are formed at the same position in the chain running direction X (namely, opposite positions in the guide width direction).

The third contact convex portions 70 are each formed to protrude inward in the guide width direction from the inner side faces of the guide lips 40. As shown in FIG. 4, each third contact convex portion 70 includes a third peak that is positioned innermost in the guide width direction in the third contact convex portion 70, a third upstream slope 71 positioned upstream of the third peak in the chain running direction X, and a third downstream slope 72 positioned downstream of the third peak in the chain running direction X.

The third upstream slope 71 is formed as a curved surface bulging inward in the guide width direction as shown in FIG. 4, and inclined inward in the guide width direction toward downstream of the chain running direction X. The third downstream slope 72 is formed as a curved surface bulging inward in the guide width direction, and inclined inward in the guide width direction toward downstream of the chain running direction X.

The rear end of the first downstream slope 52 and the front end of the third upstream slope 71, and the rear end of the third downstream slope 72 and the front end of the second upstream slope 61 are connected, in the chain running direction X, with the inner side face of the guide lip 40, which is formed flat along the chain running direction X (straight when viewed in plan) as shown in FIG. 4.

As shown in FIG. 4, the distance L in the guide width direction between the third peaks of the pair of third contact convex portions 70, similarly to the distances between the pair of first peaks and the pair of second peaks, is set smaller than the distance in the guide width direction between the pair of guide lips 40 in other parts.

Between the first peaks of the first contact convex portions 50 and the third peaks of the third contact convex portions 70, and between the third peaks of the third contact convex portions 70 and the second peaks of the second contact convex portions 60 in the chain running direction X are formed contact avoid zones 80, where the inner side faces of the guide lips 40 are offset outward in the guide width direction so that contact between the chain 20 and the guide lips 40 is avoided in these contact avoid zones 80.

Figure 5:
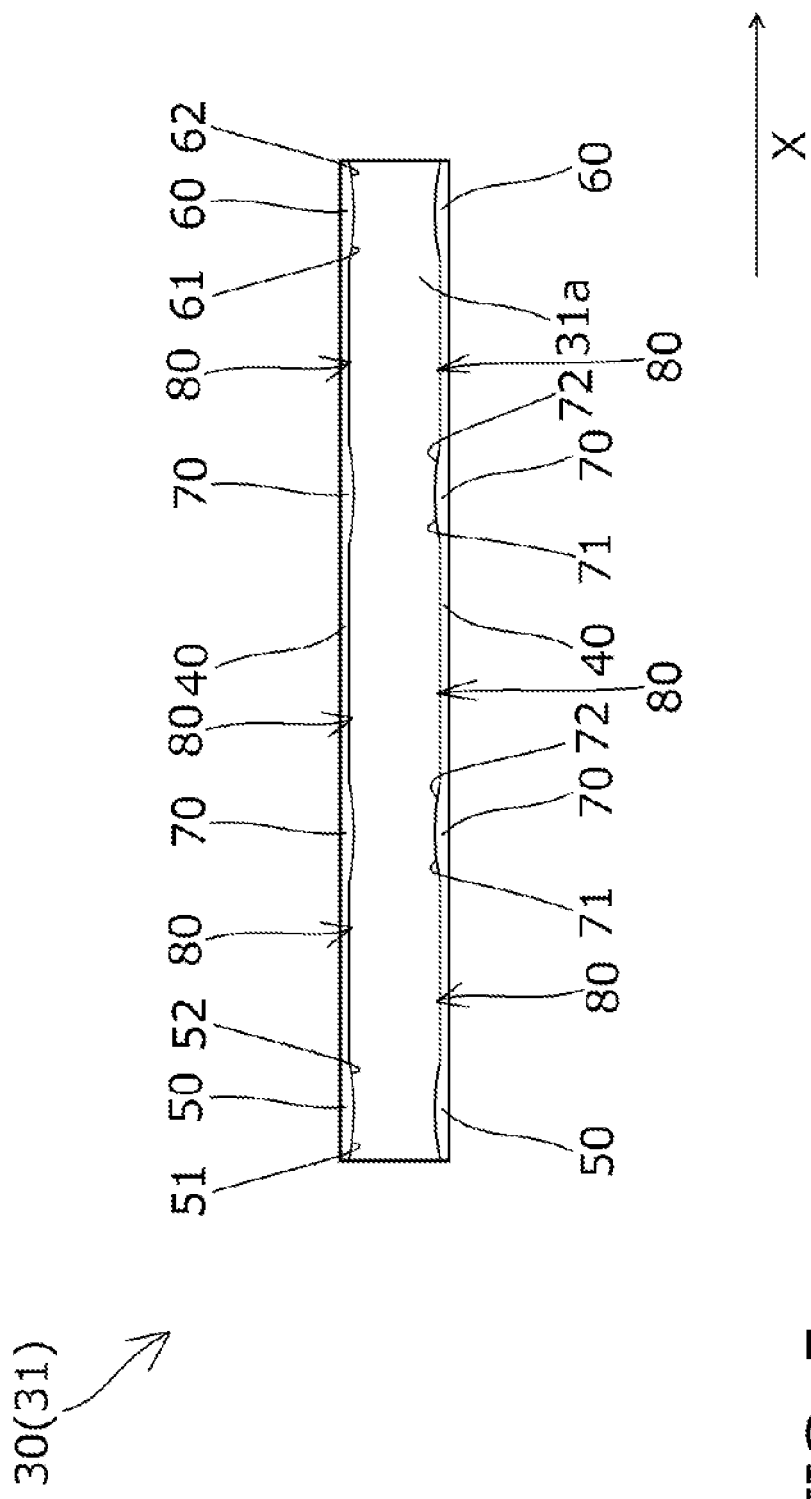
FIG. 5 is a plan view showing a variation example of the second embodiment.

While one third contact convex portion 70 is provided between the first contact convex portion 50 and the second contact convex portion 60 in the embodiment described above, two or more third contact convex portions 70 may be provided as a variation example as shown in FIG. 5.

Figure 6:
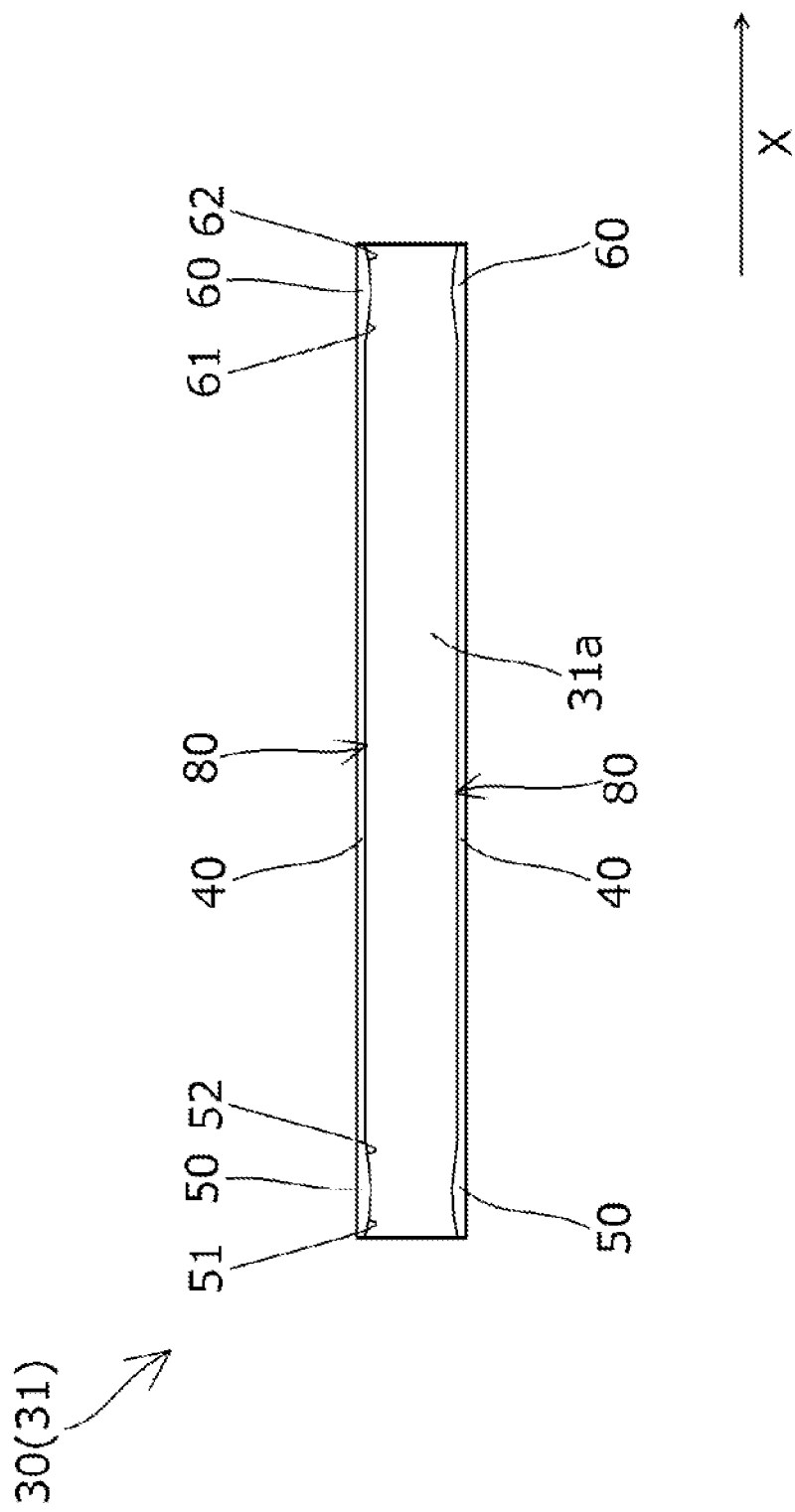
FIG. 6 is a plan view showing the guide shoe of a chain guide according to a third embodiment.

Next, a chain transmission 10 according to a third embodiment of the present invention will be described with reference to FIG. 6. The third embodiment is the same as the previously described first embodiment except some parts of the guide lips 40, and therefore the configurations other than the differences will not be described.

In the first embodiment described above, the first downstream slopes 52 are each formed as curved surfaces bulging inward in the guide width direction. In the third embodiment, the first downstream slopes 52 are each formed flat (straight when viewed in plan) and inclined outward in the guide width direction toward the downstream of the chain running direction X as shown in FIG. 6. Thus the distance between the pair of first downstream slopes 52 opposing each other in the guide width direction gradually increases towards the downstream side of the chain running direction X.

The first upstream slopes 51, second upstream slopes 61, and second downstream slopes 62 may also be formed flat (straight when viewed in plan) similarly.

Next, a chain transmission 10 according to a fourth embodiment of the present invention will be described with reference to FIG. 7. The fourth embodiment is the same as the previously described first embodiment except some parts of the guide lips 40, and therefore the configurations other than the differences will not be described.

Figure 7:
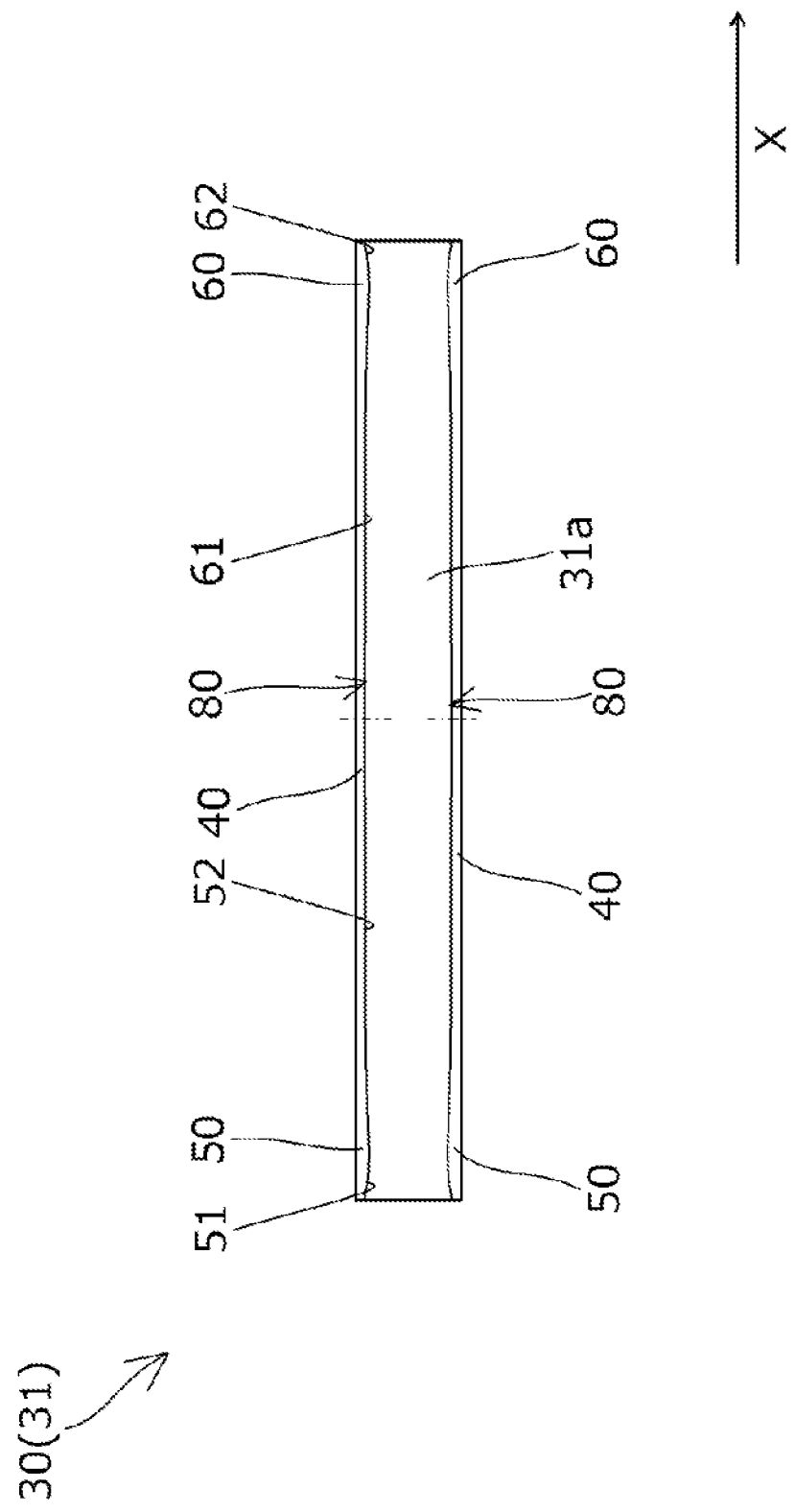
FIG. 7 is a plan view showing the guide shoe of a chain guide according to a fourth embodiment.

In the fourth embodiment, as shown in FIG. 7, the rear end of the first downstream slope 52 is continuous with the front end of the second upstream slope 61 in the chain running direction X.

The first downstream slopes 52 are formed as curved surfaces that are recessed inward in the guide width direction. The second upstream slopes 61 are formed as curved surfaces that are recessed inward in the guide width direction. Thus the first downstream slopes 52 and second upstream slopes 61 together form a curved surface that is recessed outward in the guide width direction.

The rear end of the first downstream slope 52 is continuous with the front end of the second upstream slope 61 on both of the pair of guide lips 40 in the fourth embodiment, as shown in FIG. 7. Instead, the rear end of the first downstream slope 52 and the front end of the second upstream slope 61 may be made continuous on one of the pair of guide lips 40.

Next, a chain transmission 10 according to a fifth embodiment of the present, invention will be described with reference to FIG. 8. The fifth embodiment is the same as the previously described first embodiment except some parts of the guide lips 40, and therefore the configurations other than the differences will not be described.

Figure 8:
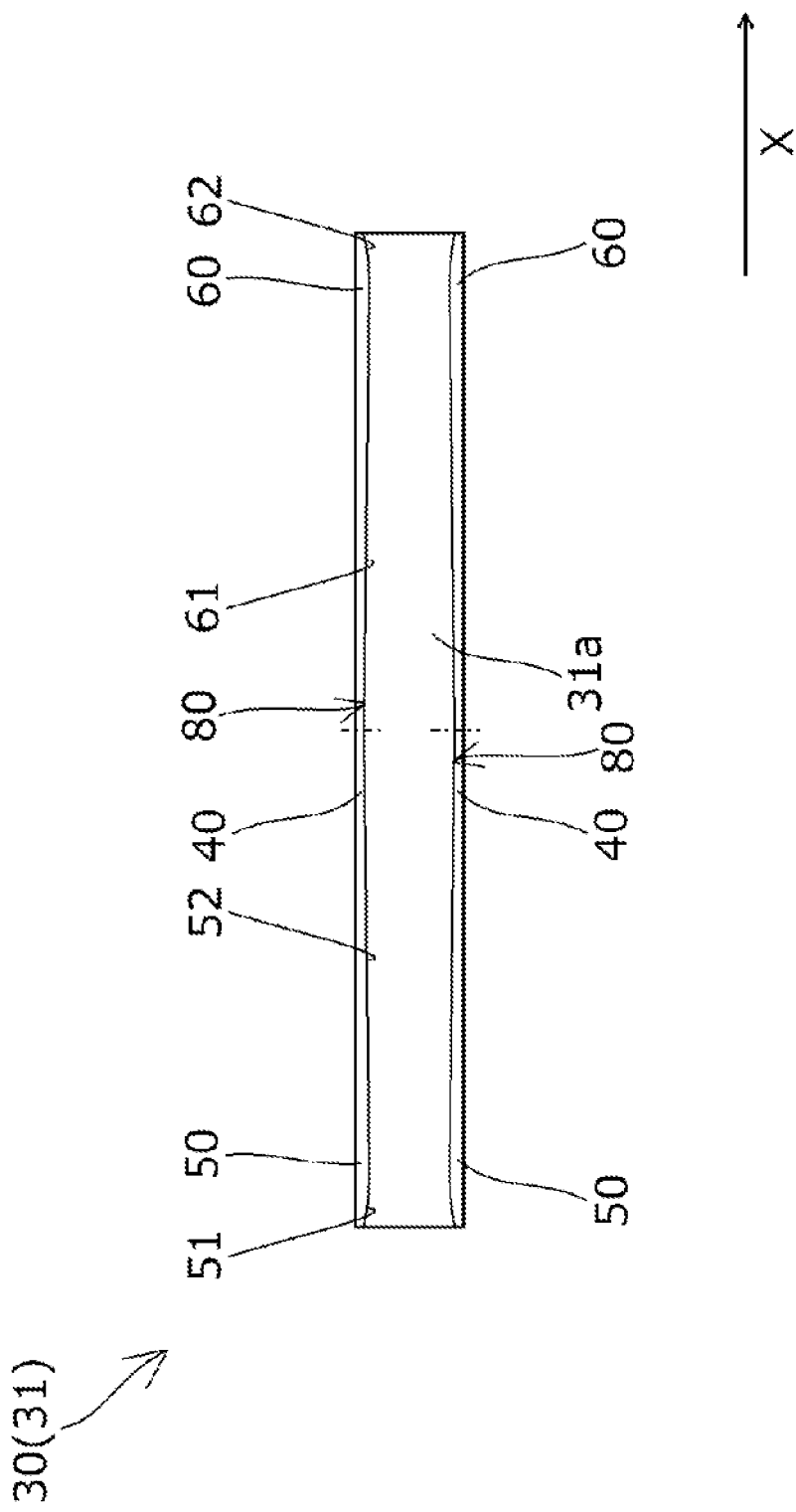
FIG. 8 is a plan view showing the guide shoe of a chain guide according to a fifth embodiment.

In the fifth embodiment, as shown in FIG. 8, the rear end of the first downstream slope 52 is continuous with the front end of the second upstream slope 61 in the chain running direction X.

The first downstream slope 52 is formed flat (straight when viewed in plan) and inclined outward in the guide width direction toward the downstream of the chain running direction X.

The second upstream slope 61 is formed flat (straight when viewed in plan) and inclined inward in the guide width direction toward the downstream of the chain running direction X.

A curbed portion may be formed in a connecting portion between the rear end of the first downstream slope 52 and the front end of the second upstream slope 61 so that the rear end of the first downstream slope 52 and the front end of the second upstream slope 61 are smoothly continuous.

The rear end of the first downstream slope 52 is continuous with the front end of the second upstream slope 61 on both of the pair of guide lips 40 in the fifth embodiment as shown in FIG. 8. Instead, the rear end of the first downstream slope 52 and the front end of the second upstream slope 61 may be made continuous on one of the pair of guide lips 40.

Next, a chain transmission 10 according to a sixth embodiment of the present invention will be described with reference to FIG. 9. The sixth embodiment is the same as the previously described first embodiment except some parts of the guide lips 40, and therefore the configurations other than the differences will not be described.

Figure 9:
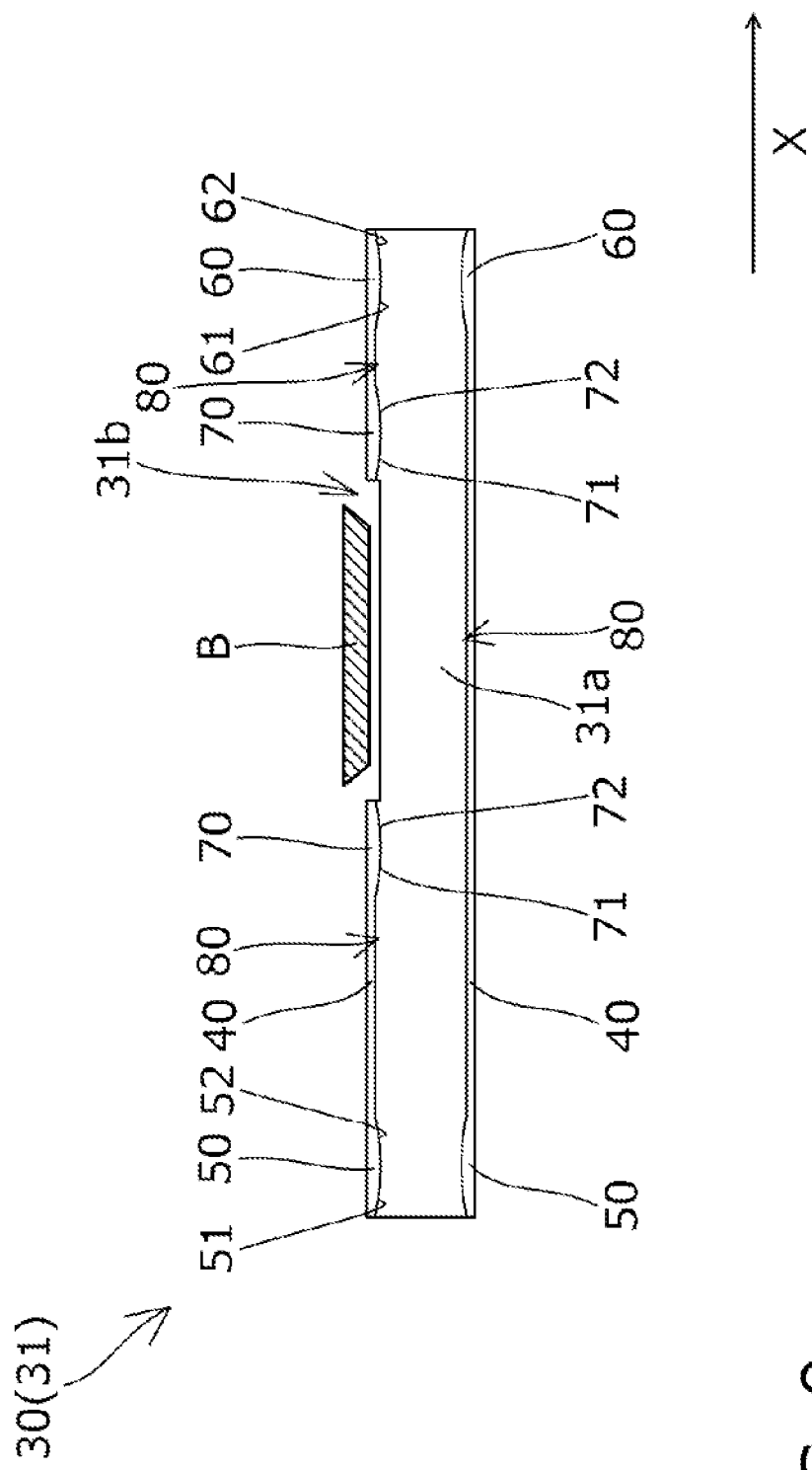
FIG. 9 is a plan view showing the guide shoe of a chain guide according to a sixth embodiment.

In the sixth embodiment, the chain guide 30 is formed with a cut-off portion 31b recessed inward in the guide width direction at the edge on one side of the chain guide 30 in the guide width direction as shown in FIG. 9 in order to avoid interference with part of the engine block B or the like.

The cut-off portion 31b is formed in an intermediate position between the first contact convex portion 50 and second contact convex portion 60 as shown in FIG. 9, Thus one of the guide lips 40 (the guide lip 40 provided with the cut-off portion 31b) is divided into a plurality of parts in the chain running direction X by the provision of the cut-off portion 31b.

As shown in FIG. 9, a third contact convex portion 70 is formed at the downstream end of the guide lip 40 portion upstream of the cut-off portion 31b, and a third contact convex portion 70 is formed at the upstream end of the guide lip 40 portion downstream of the cut-off portion 31b.

The rear end of the first downstream slope 52 and the front end of the third upstream slope 71 of the (upstream) third contact convex portion 70, and the rear end of the third downstream slope 72 of the (downstream) third contact convex portion 70 and the front end of the second upstream slope 61, are each connected with the inner side face of the guide lip 40, which is formed flat along the chain running direction X (straight when viewed in plan).

While one cut-off portion 31b is formed between the first contact convex portion 50 and the second contact convex portion 60 in the example shown in FIG. 9, two or more cut-off portions 31b may be formed between the first contact convex portion 50 and the second contact, convex portion 60.

While the cut-off portion 31b is formed at the edge on only one side in the guide width direction of the chain guide 30 in the example shown in FIG. 9, the cut-off portions 31b may be formed on both side edges in the guide width direction of the chain guide 30.

A third contact convex portion 70 may be formed on the guide lip 40 that is not provided with the cut-off portion 31b (at a position, for example, opposite the third contact convex portion 70 mentioned above in the guide width direction).

While embodiments of the present invention have been described in detail, the present invention is not limited to the above-described embodiments and may be carried out with various design changes without departing from the scope of the present invention set forth in the claims.

For example, various configurations of the plurality of embodiments described above may be freely combined to form other chain transmissions.

Also, while the chain transmission was described as one that is incorporated in a timing chain of a car engine in the embodiments above, the chain transmission may be used for any specific purposes.

While the chain guide is configured as a pivot guide pivotally attached to an engine block (attachment target) in the embodiments described above, the chain guide may be configured as a fixed guide fixed to the engine block.

While the chain was described as a roller chain in the embodiments above, the chain may have any specific form such as a bushing chain, or silent chain, as long as it is formed by a plurality of link plates pivotally coupled together with connecting pins.

While the chain guide is formed from a guide shoe and a base member, with both of the guide rail surface and guide lips being formed on the guide shoe in the embodiments described above, the chain guide is not limited to this specific design. For example, the chain guide may entirely be formed in one piece, or guide lips may be formed on the base member.

While the contact convex portions (the first contact convex portion, second contact convex portion, and third contact convex portion) are integrally formed on the guide lips in the embodiments described above, the contact convex portions are not limited to the specific forms described above. The contact convex portions may be formed separately from the guide lips, and fixedly attached to the inner side faces of the guide lips by means of adhesive or the like.

Connecting portions between various parts (the first upstream slope, first downstream slope, second upstream slope, second downstream slope, third upstream slope, and third downstream slope) of the contact convex portions (the first contact convex portion, second contact convex portion, and third contact convex portion), and connecting portions between these various parts of the contact convex portions and inner side faces of other parts of the guide lips may be formed as curved portions that connect these parts smoothly.

While the pairs of contact convex portions (the first contact convex portions, second contact convex portions, and third contact convex portions) are formed at the same position in the chain running direction in the embodiments described above, the pairs of contact convex portions (the first contact convex portions, second contact convex portions, and third contact convex portions) may be located at positions offset in the chain running direction.

The distance between the pair of first peaks, the distance between the pair of second peaks, and the distance between the pair of third peaks are set all the same in the embodiments described above, but the distance between the pair of first peaks, the distance between the pair of second peaks, and the distance between the pair of third peaks may be set differently.

While the contact convex portions (the first contact, convex portion, second contact convex portion, and third contact convex portion) protrude in the guide width direction the same amount in the embodiments described above, the amount of protrusion of the contact convex portions in the guide width direction may be set differently.

What is claimed is:

1. A chain guide that slidably guides a chain, comprising:
a guide rail surface that slidably guides the chain; and
guide lips protruding upward on both side edges of the guide rail surface in a guide width direction,
the guide lips each including a first contact convex portion protruding from an inner side face of each corresponding guide lip on an upstream end in a chain running direction, and a second contact convex portion protruding from the inner side face of each corresponding guide lip on a downstream side of the first contact convex portion,
the first contact convex portion including a first peak positioned innermost in the guide width direction in the first contact convex portion, and a first upstream slope formed upstream of the first peak in the chain running direction and inclined inward in the guide width direction toward a downstream side in the chain running direction,
the second contact convex portion including a second peak positioned innermost in the guide width direction in the second contact convex portion, and a second upstream slope formed upstream of the second peak in the chain running direction and inclined inward in the guide width direction toward a downstream side in the chain running direction,
wherein at least one of the guide lips includes a third contact convex portion protruding from the inner side face of each corresponding guide lip in a region between the first contact convex portion and the second contact convex portion in the chain running direction,
wherein the third contact convex portion includes a third peak positioned innermost in the guide width direction in the third contact convex portion, and a third upstream slope formed upstream of the third peak in the chain running direction and inclined inward in the guide width direction toward a downstream side in the chain running direction,
wherein the chain guide further comprises a cut-off portion formed such as to be recessed inward in the guide width direction at an edge on at least one side of the chain guide in the guide width direction,
wherein at least one of the guide lips is divided into a plurality of parts in the chain running direction by formation of the cut-off portion, and
wherein the third contact convex portion is divided into two parts such that a first part of the third contact convex portion is formed at a downstream end of a guide lip portion that is positioned upstream of the cut-off portion and a second part of the third contact convex portion is formed at an upstream end of a guide lip portion that is positioned downstream of the cut-off portion.

2. The chain guide according to claim 1, wherein the first contact convex portion includes a first downstream slope that is formed downstream of the first peak in the chain running direction and is inclined outward in the guide width direction toward the downstream side in the chain running direction, and
the first downstream slope and the second upstream slope are formed flat or as a curved surface bulging inward in the guide width direction.

3. The chain guide according to claim 1, wherein at least one of the guide lips is formed continuously from the first contact convex portion to the second contact convex portion.

4. A chain transmission comprising:
the chain guide according to claim 1, and
a chain slidably guided by the chain guide.

* * * * *